(12) United States Patent
Ashlock

(10) Patent No.: US 6,301,824 B1
(45) Date of Patent: Oct. 16, 2001

(54) STINK BAIT SAVER

(76) Inventor: Donald Lee Ashlock, R.R. 2 Box 2167, Fair Play, MO (US) 65649

(*) Notice: Subject to any disclaimer, the term of this patent is extended or adjusted under 35 U.S.C. 154(b) by 0 days.

(21) Appl. No.: 09/473,832

(22) Filed: Jan. 3, 2000

(51) Int. Cl.[7] .................................................. A01K 97/02
(52) U.S. Cl. ........................................................... 43/44.99
(58) Field of Search ............................... 43/42.06, 44.99, 43/56, 54.1, 55; 206/315.11; 215/318, 329, 344, 343, 341, 320; 220/501, 506, 522, 526, 23.89, 23.86, 23.87; 239/34, 57

(56) References Cited

U.S. PATENT DOCUMENTS

| | | | | |
|---|---|---|---|---|
| 2,731,908 | * | 1/1956 | Morena | 43/44.99 |
| 2,844,907 | * | 7/1958 | Merton | 43/44.99 |
| 3,084,471 | * | 4/1963 | Alspaugh | 43/44.99 |
| 3,091,882 | * | 6/1963 | Dudley | 43/56 |
| 3,510,978 | * | 5/1970 | Murdock | 43/56 |
| 3,910,461 | * | 10/1975 | Eager | 222/131 |
| 3,916,556 | * | 11/1975 | Armanno | 43/42.06 |
| 4,054,004 | * | 10/1977 | Schott | 43/42.06 |
| 4,267,658 | * | 5/1981 | Brown et al. | 43/42.06 |
| 4,648,529 | * | 3/1987 | Blakemore et al. | 220/501 |
| 4,685,242 | * | 8/1987 | Stanish | 43/44.99 |
| 5,131,183 | * | 7/1992 | Thayer et al. | 43/44.99 |
| 5,638,630 | * | 6/1997 | Volaski | 43/44.99 |

FOREIGN PATENT DOCUMENTS

| | | | | |
|---|---|---|---|---|
| 646955 | * | 8/1962 | (CA) | 43/42.06 |
| 1266093 | * | 5/1961 | (FR) | 43/44.99 |
| 2132862 | * | 7/1984 | (GB) . | |
| WO 97/30584 | * | 8/1997 | (WO) . | |

* cited by examiner

*Primary Examiner*—Darren W. Ark

(57) ABSTRACT

The stink bait saver is to be conveniently used for fishing with stink bait, as you can fill the inside slotted container with stink bait, screw the container onto the inside threads of lid with preformed eye and suspend in the water while fishing for stink bait loving fish. When the fisherman is through for the day he can bring up the container with the stink bait and seal it in the outside container, which is screwed onto the outside threads in the same lid that is already attached to the inside container. This seals the scent and mess to store for another fishing trip. This is very cost effective as no new stink bait has to be purchased to fish again. As the containers are made from plastic they can be recycled; thus they are "Environmentally Friendly" product.

1 Claim, 6 Drawing Sheets

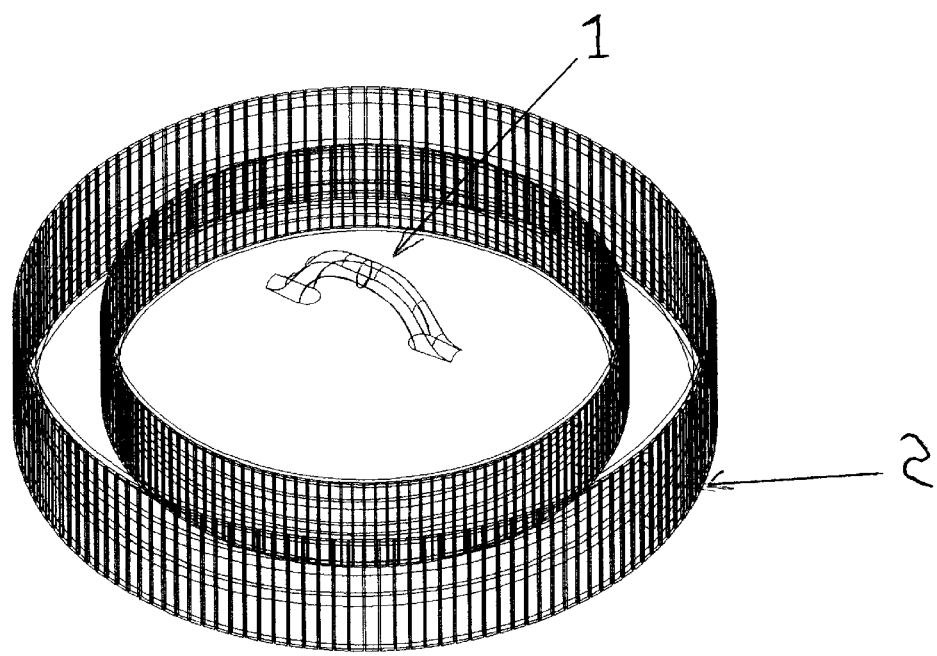
FIG. 1
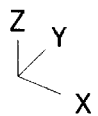

FIG'3

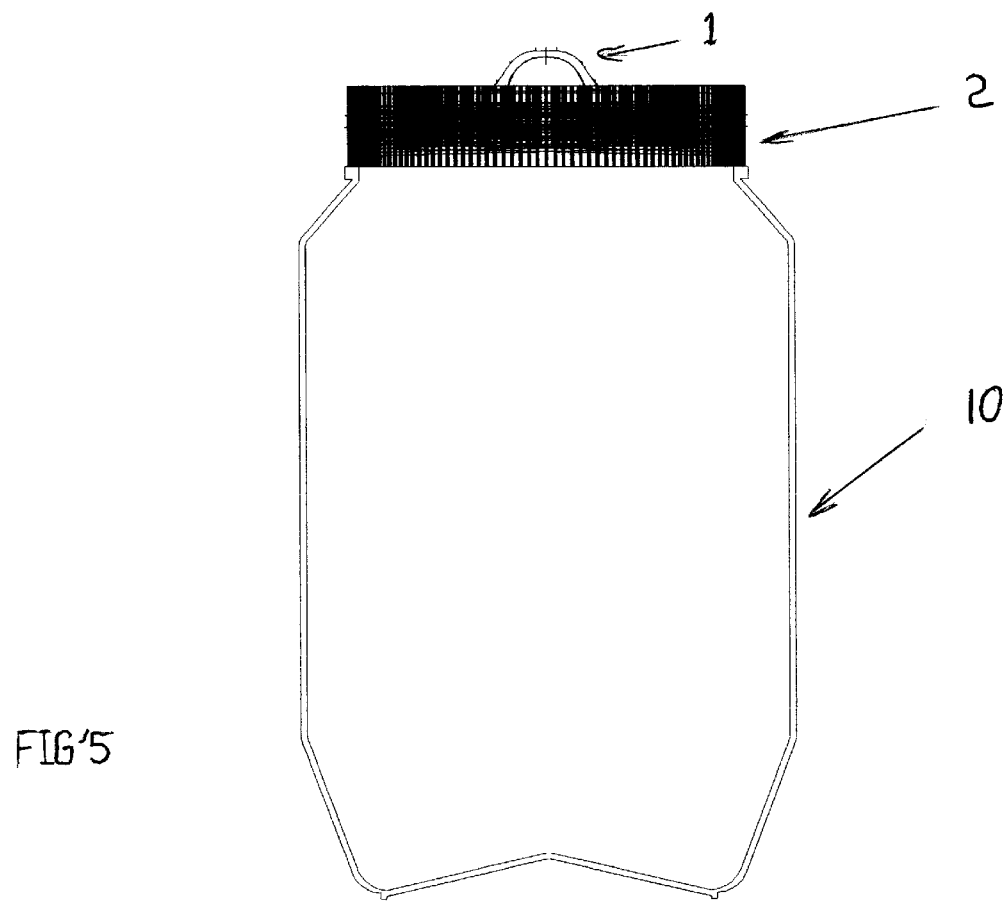
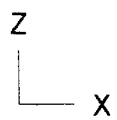
FIG'5

STINK BAIT SAVER

BACKGROUND OF THE INVENTION

1. Field of the Invention

The invention relates in general to stink bait and in particular to saving the stink bait product to use again and in turn creating monetary savings for the fisherman.

2. Prior Art

When a fisherman uses stink bait to fish for this type of bait loving fish, as to Catfish, the fisherman has to throw away the bait at the end of that day's fishing time, be it one hour or one day.

An extensive patent search was done and no other patent used the idea of saving the stink bait, with no mess or smell, for the next fishing trip.

SUMMARY OF THE INVENTION

The principal object of this invention is to save the fisherman money by reusing the stink bait.

It also is an object of the present invention to provide such a container, which is of simple and inexpensive construction.

Another object is to provide such a container in a lightweight form that can be reassembled quickly and easily at the end of the fishing day and stored in the tackle box for a future fishing trip.

A further object is to provide such a container, which will increase the numbers of fishermen using stink bait, because of the economical advantage of reusing stink bait and storing scent free.

Another advantage of this container is that it is made of plastic and will not pollute, if recycled, the environment at the end of the usage.

The foregoing objects can be accomplished by providing a container that can be suspended on a line over the side of the boat that can be brought back up at the end of the fishing day, resealed in another container that fits over the stink bait container and screws into the same lid. In the preferred embodiment of the invention, the stink bait is put into the inside container that has slots in the sides and small holes in the bottom. This container is then screwed onto the lid that has two sets of threads on the inside and an eye in the top to attach the line that is used to suspend the container over the side of the boat, dock, or tree limb. This container is made of semi-rigid (sturdy) plastic so that it will not crack or tear if motion of water hits container against the rocks. Upon taking the container, with the bait, out of the water you would immediately put the outer container over the bait container and screw into the outer threads ($2^{nd}$ set of threads), in the lid that the bait container is already attached, thus sealing the scent and retaining the consistency of bait until next fishing trip.

BRIEF DESCRIPTION OF THE DRAWINGS

FIG. 1 is a top view of the lid with the eye to use for suspension.

FIG. 5 is a view of the outer container and lid with eye.

DETAILED DESCRIPTION

Figure 2:
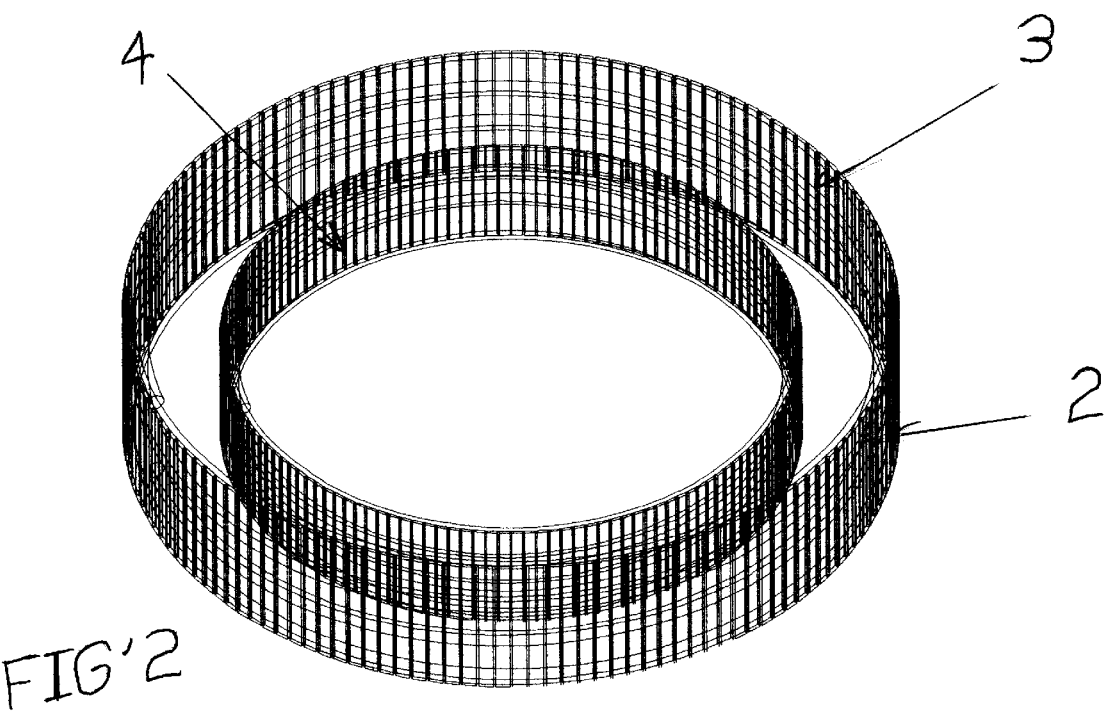
FIG. 2 is the underside view of the two sets of the threads in the lid.

With reference now to the FIGURES wherein like reference characters designate like or similar parts throughout the several views. FIG. 1 is a perspective view of the lid to the stink bait container. The eye (1) and the lid (2) are molded together in a rigid plastic measuring 3½ inches in diameter. As shown in FIG. 2 the inside of the lid (2) has two sets of threads. The inside set of threads (4) is used to attach the inside container (5) from FIG. 3. The outside threads (3) from FIG. 2 are used to attach the outside container (6) from FIG. 5.

Figure 3:
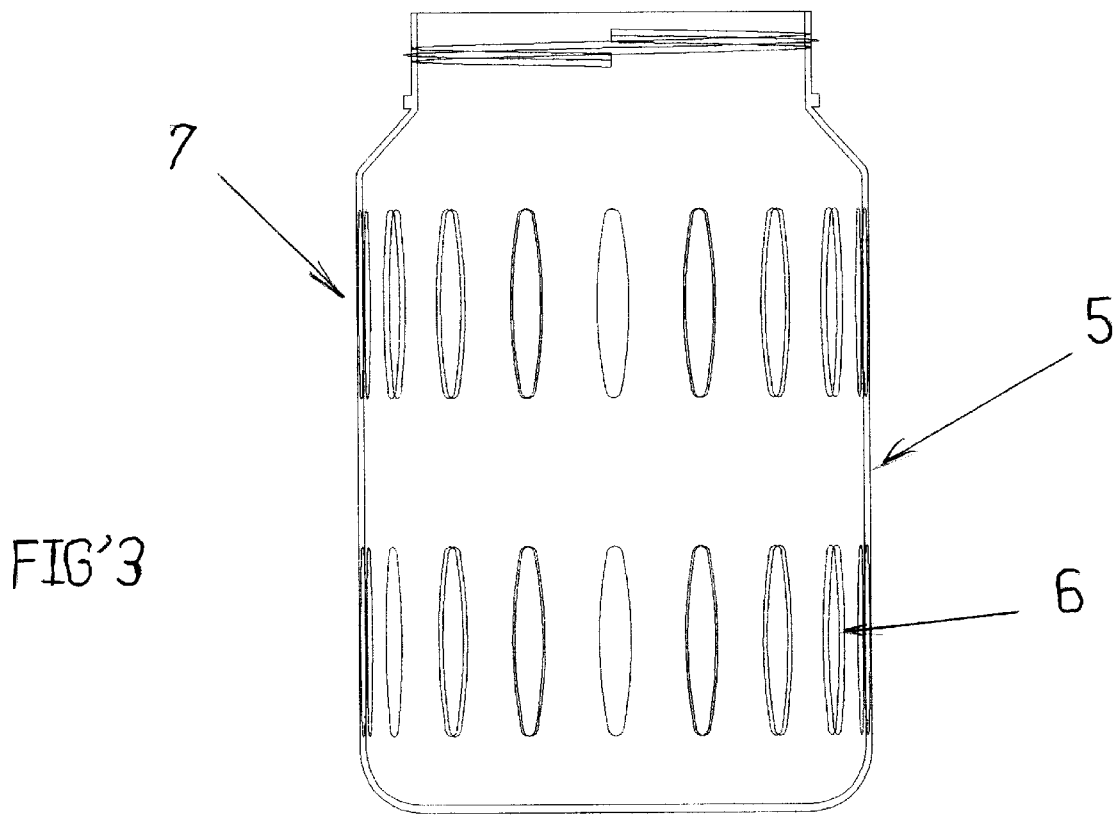
FIG. 3 is the inside bait holding container with the slots in the sides and holes in the bottom.

The inside container (5) from FIG. 3 is 3 inch in diameter and 4½ inches tall. There are nine slots (6) $3/16^{th}$ of an inch wide and 1½ inches long placed 1 inch apart around the bottom half of the container (5). There are nine slots (7) $3/16^{th}$ of an inch wide and 1½ inches long placed 1 inch apart around the top half of the container (5) that alternates with bottom slots (6).

Figure 4:
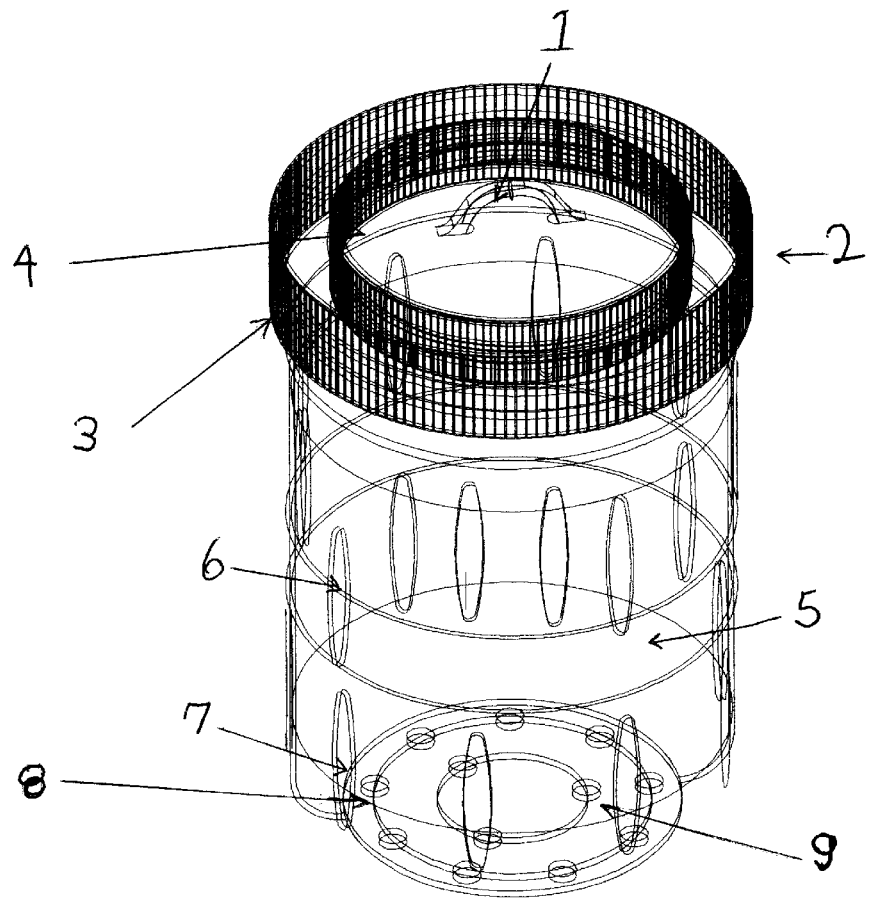
FIG. 4 is a view of the bait holding container with slots in the sides and holes in the bottom attached to the $1^{st}$ set of threads in the lid

As in FIG. 4 the inside container (5) is threaded into the inside threads (4) of the lid (2) as shown in FIG. 2. There are $9/16^{th}$ of an inch holes (8) in the bottom of the inside container (5) spaced 1 inch apart around the outside edge and $3/16^{th}$ of an inch holes (9) in the center bottom of the container (5). FIG. 4 also shows the outside threads (3) in the lid (2) with the preformed eye (1). FIG. 4 is the stink bait saver that is filled with stink bait and the suspended into the water from the line that is attached to the eye (1).

The outside container (10) is 3¼ inch diameter and 5 inches tall. The outside container (10) is the storage container (10) that is threaded onto the outside threads (3) of lid (2) with the eye (1).

Figure 6:
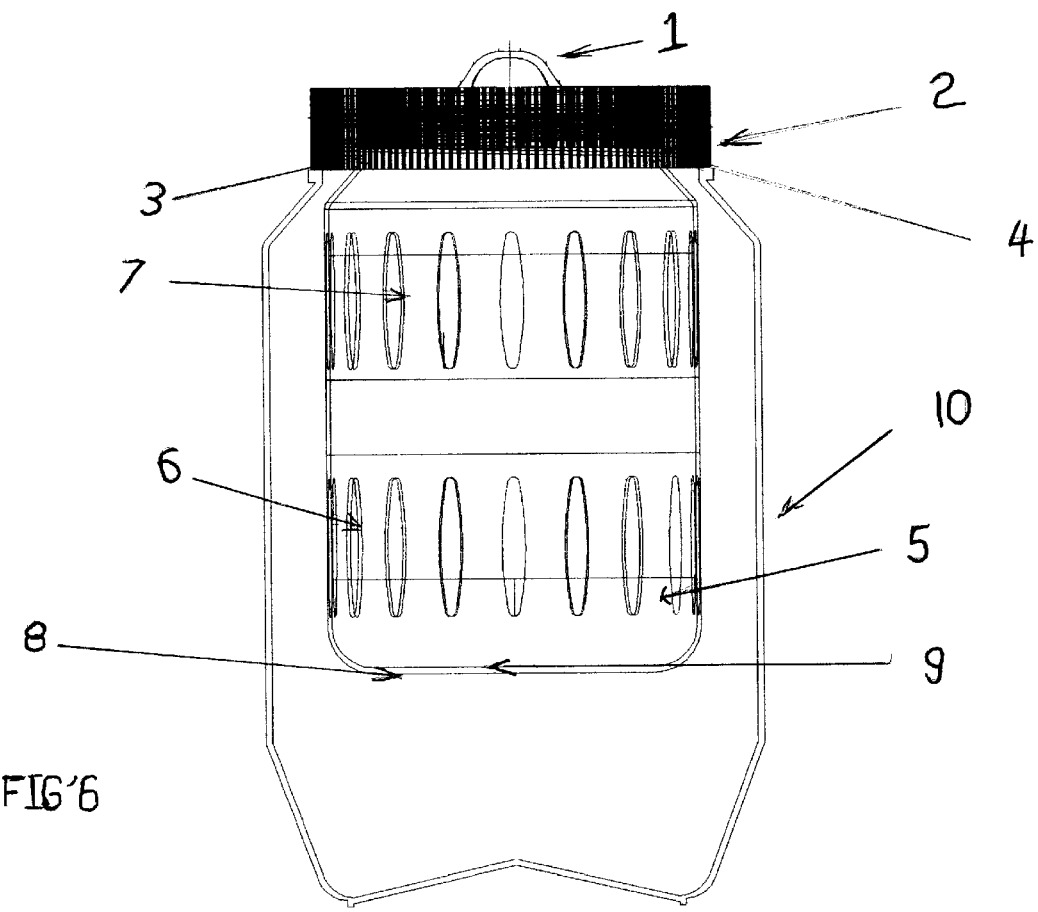
FIG. 6 is a side view of the completed invention.

Refer now to FIG. 6, which is an overall drawing of a preferred embodiment of the invention. The outside container (10) and the inside container (5) are made of a semi-rigid plastic that is recyclable. The stink bait is put into the container (5) and threaded onto lid (2) using inside threads (4) and suspended from eye (1) with line. When finished for the day, bring up container (5) and put into storage container (10) screw onto lid (2) using outside threads (3) and stink bait is ready to store scent and mess free until next fishing trip, thus no need to purchase new stink bait.

The foregoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A dual container comprising:

an outer semi-rigid plastic container having a diameter of 3.25 inches and a height of 5 inches;

an inner semi-rigid plastic container having a diameter of 3 inches, a height of 4.5 inches, nine slots on an upper half of the inner container which are each $3/16^{th}$ of an inch wide and 1.5 inches long and are spaced 1 inch apart from each other alternating with nine slots on a lower half of the inner container which are each $3/16^{th}$ of an inch wide and 1.5 inches long and are spaced 1 inch apart from each other, nine $3/16^{th}$ of an inch holes spaced 1 inch apart from each other around an outer edge of the inner container, and three $3/16^{th}$ of an inch holes in a central portion of a bottom of the inner container;

a rigid plastic primary closure lid having a diameter of 3.5 inches, an eye that is formed on a top of the lid, inside threads on an inner wall of the lid for attaching to said inner semi-rigid plastic container, and inside threads on an outer wall of the lid for attaching to said outer semi-rigid plastic container;

wherein when the dual container is to be used, the inner container is engageable with the inside threads on the inner wall of the lid, a cord can be passed through the eye so as to suspend the inner container in water, and the outer container is engage able with the inside threads of the outer wall of the lid so as to store the inner container therein when finished.

* * * * *